June 16, 1931.  J. P. O'LEARY  1,810,290
SUPPLEMENTAL WHEEL FOR MOTOR VEHICLES
Filed Nov. 20, 1929  2 Sheets-Sheet 1
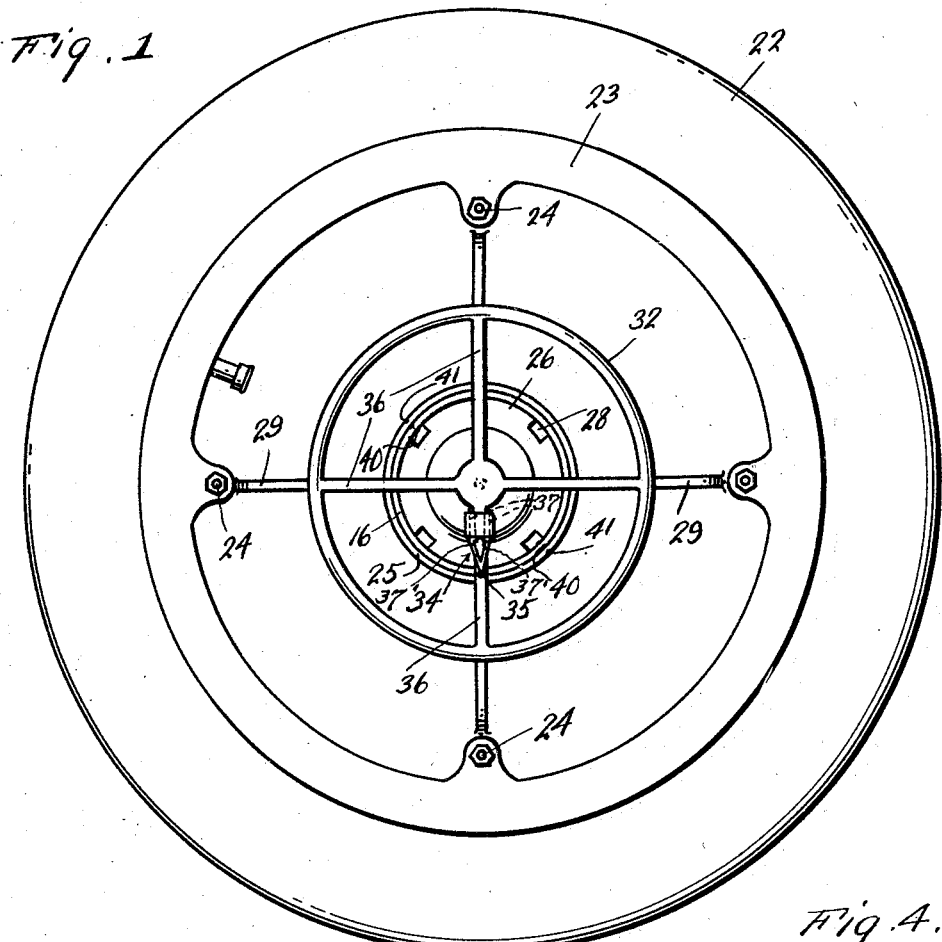
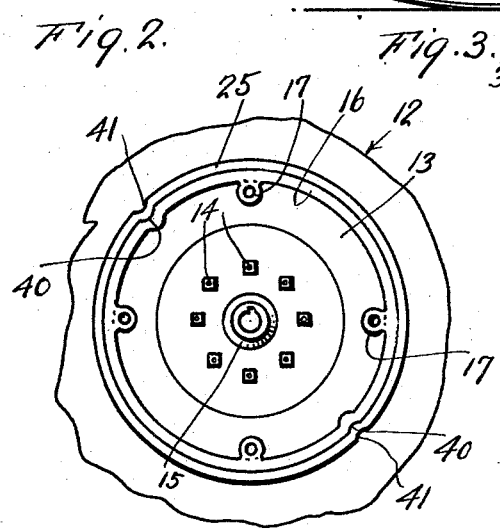
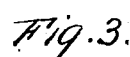
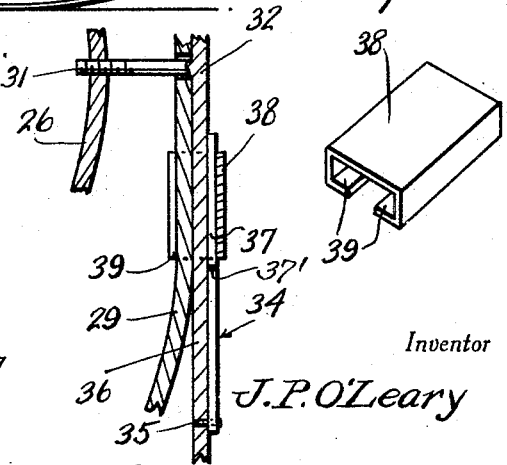
Inventor
J. P. O'Leary
By Clarence A. O'Brien
Attorney

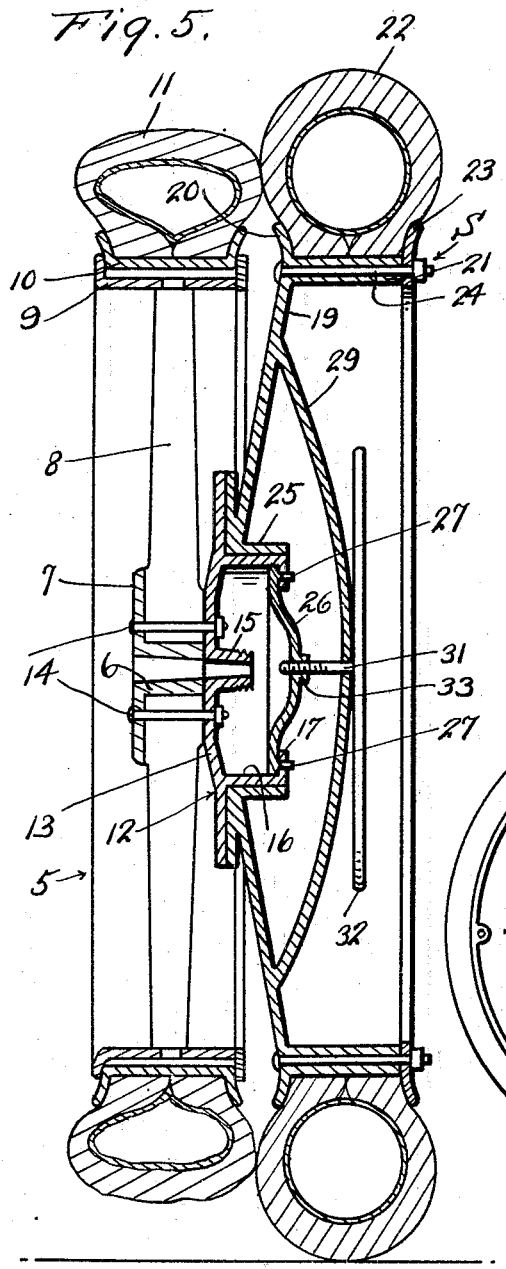

Patented June 16, 1931

1,810,290

UNITED STATES PATENT OFFICE

JOHN PATRICK O'LEARY, OF LONG ISLAND CITY, NEW YORK

SUPPLEMENTAL WHEEL FOR MOTOR VEHICLES

Application filed November 20, 1929. Serial No. 408,542.

This invention relates to a supplemental wheel, for use on a motor vehicle in conjunction with a supporting wheel of the vehicle when a pneumatic tire has become deflated because of a puncture or some other cause.

The primary object of the present invention is to provide a supplemental or emergency wheel of simple construction, comprising but comparatively few parts, and which is adapted to be easily and quickly applied to a supporting wheel of a vehicle whose tire has become deflated, without using wrenches of any kind.

Other objects and advantages of the invention will become apparent during a study of the following description taken in connection with the accompanying drawings, wherein:

Figure 1 is a side elevational view of a supplemental wheel constructed in accordance with the present invention.

Figure 2 is a fragmentary detail elevational view clearly showing the manner of securing the supplemental wheel to a supporting wheel of a vehicle.

Figure 3 is a fragmentary detail sectional view of the supplemental wheel representing details of construction to be hereinafter referred to.

Figure 4 is a perspective view of a locking member to be hereinafter more fully referred to.

Figure 5 is a transverse sectional view taken through the supplemental wheel, the same being shown secured to one of the supporting wheels of a vhicle.

Figure 6 is a fragmentary detail elevational view representing certain other details of constructions to be hereinafter more specifically referred to.

Figure 7 is an elevational view of the supplemental wheel, the same being shown on a small scale, the handwheel not shown therewith.

Figure 8 is a fragmentary detail elevational view illustrating the manner of associating the locking sleeve with one of the arms 29 of the supplemental wheel, certain parts of the sleeve being broken away.

With reference more in detail to the drawings, it will be seen that I have designated a conventional supporting wheel of a vehicle generally by the reference character 5. The supporting wheel 5 comprises the conventional hub 6 having a flange 7 at one end thereof, which hub 6 is also provided with a plurality of radial spokes 8 having at their outer ends an annular rim 9 supporting a tire rim 10 carrying the pneumatic tire 11, all of which is of conventional construction.

The supplemental wheel is designated generally by the reference character S.

Carried by the supporting wheel 5 and adapted to be permanently carried thereby and also constituting a part of the hub 6 is an auxiliary hub member designated generally by the reference character 12. This auxiliary hub member 12 comprises a somewhat concavo-convex disc-like body portion 13 positioned against the outer side of the wheel 5, and the flange 7 of the hub 6 and the member 13 are secured together by means of bolts 14 as shown to advantage in Figure 5.

The plate member 13 centrally thereof is provided with an inwardly extending hub-like portion 15 forming a continuation of the hub 6. Inwardly from its marginal edge, the plate 13 is provided with a laterally directed annular flange 16, on the outer end of which is provided at spaced points on its periphery inwardly directed aperatured lugs 17. The purpose of these apertured lugs 17 will be hereinafter more fully set forth.

The supplemental or auxiliary wheel S is somewhat in the nature of a disc wheel comprising, the disc-like body portion 19 provided at its periphery with a laterally and radially outwardly curved flange 20. Radially inwardly from said flange 20, the disc 19 is provided with a peripheral rim 21 for supporting a pneumatic tire 22 of a diameter substantially equal to the diameter of the pneumatic tire 11 above referred to.

The pneumatic tire 22 is held upon the rim 21 between the flange 20 and an annular retaining ring 23, which ring 23 is retained in place through the medium of bolts 24 passing through the rim 21 and said ring 23 as shown in Figure 5. The disc body 19 of the supplemental wheel is provided with a centrally arranged opening having a laterally directed flange 25 surrounding said opening.

In actual practice, the flange 16 of the auxiliary hub member 12 is passed through the opening in the disc 19 with the flange 25 about said opening being arranged concentric to said flange 16.

What may be termed a hub-cap 26 is in the nature of a concave disc receivable within the confines of the flange 16, and this disc adjacent its periphery at circumferentially spaced points thereon is provided with laterally directed studs 27 adapted to be received in the apertures of the lugs 17 carried by said flange 16. To facilitate the placing of the hub cap 26 within the auxiliary hub 12, said hub cap 26 has formed on the periphery thereof and arranged in alternating relation with respect to the studs 27, radial notches 28, there being one notch 28 for each apertured lug 17. The lugs 17 are passed through the notches 28 and the disc or hub cap 26 is then rotated so as to bring the studs 27 in position to be subsequently drawn through the apertured lugs 17 as is apparent.

Radial arms 29 are formed integrally with the disc 19 and extend inwardly from the disc to merge into a flat disc-like web 30 disposed opposite the auxiliary hub member 12. This disc-like web 30 is apertured to receive therethrough the shaft 31 of a hand wheel designated generally by the reference character 32. The shaft 31 has its free end portion threaded, and the threaded end of the shaft is threaded through an internally threaded aperture 33 formed centrally in the hub cap or disc 26 as shown in Figure 5.

Manifestly by rotating the handwheel in one direction, the hub cap or disc 26 will move axially of the hub section 12 and the studs 27 carried thereby are thus drawn through the apertured lugs 17 as is also shown in Figure 5.

When the auxiliary wheel S has been positioned on the supporting wheel 5 in the manner just described in detail, and the handwheel 32 has been rotated sufficiently for drawing the studs 27 through the apertured lugs 17, the wheel 32 may be locked against casual rotation. This locking means comprehends the provision of a substantially V-shaped spring member designated generally by the reference character 34.

At its apex the spring member 34 is anchored as at 35 to one of the spokes 36 of the handwheel, and the arms of this spring member 34 are designated generally by the reference characters 37—37. Slidable on the said one spoke of the handwheel is a sleeve-like member 38 suitably formed to provide oppositely disposed internal grooves 39—39.

As shown on Figure 3, sleeve 38 is disposed about one arm 29 and accommodates in the groove 39 the spring arms 37 when the hand wheel has been rotated for positioning the spoke 36 thereof on which is mounted the spring member 34, directly opposite said one arm 29. The arms 37 are provided with stop shoulders 37' against which the outer end of sleeve 38 abuts for limiting movement of the sleeve relative to said arm 29 and spoke 36 in one direction. Due to their resiliency, arms 37 will yieldably engage the sleeve, and as is thought manifest, the hand wheel will thus be retained against casual rotation.

As a further means of keying the auxiliary wheel S upon the auxiliary hub member 12, so as to prevent rotation of the auxiliary wheel relative to said hub member 12, the flange 16 of said member at diametrically spaced points thereon is pressed inwardly to provide keyways 40—40. Complemental thereto, the flange 25 of the auxiliary wheel S is pressed inwardly to provide keys 41 for slidable reception in the keyways 40 as shown in Figure 2.

It is believed that from a study of the foregoing description, taken in connection with the accompanying drawings, a clear understanding of the operation, construction, utility and advantages of an invention of this character will be had by those skilled in this art without a more detailed description.

Even though I have herein shown and described the preferred embodiment of my invention, it is to be understood that the same is susceptible to changes fully comprehended by the spirit of the invention and the scope of the appended claims.

Having thus described my invention, what is claimed as new is:

1. A supplemental wheel for a motor vehicle comprising in combination a hub member adapted to be secured to one side of a supporting wheel of the vehicle for rotation with said supporting wheel, a cap for the hub member received by said hub member, means carried by said cap for engagement with said hub member, and rotatable means carried by the supplemental wheel and operatively connected with said hub cap for moving the latter into and out of retaining position on said hub member.

2. A supplemental wheel for motor vehicles comprising in combination a hub member adapted to be secured to the hub of one of the supporting wheels of a vehicle, means for securing said hub member to the hub of said one supporting wheel, a cap for said hub member, means for securing said hub cap to said hub member, a hand wheel, means for rotatably supporting said hand wheel on said supplemental wheel, means operatively connecting said hand wheel with said hub cap whereby upon rotation of said hand wheel said hub cap may be moved into and out of interlocking engagement with said hub member.

3. A supplemental wheel for motor vehicles comprising in combination a hub member adapted to be secured to the hub of one of the supporting wheels of a vehicle, means for securing said hub member to the hub of said one supporting wheel, a cap for said hub member, means for securing said hub cap to said hub member, a hand wheel, means for rotatably supporting said hand wheel on said supplemental wheel, means operatively connecting said hand wheel with said hub cap whereby upon rotation of said hand wheel said hub cap may be moved into and out of interlocking engagement with said hub member, and means for locking said hand wheel against casual rotation relative to the supplemental wheel.

4. A supplemental wheel for a vehicle comprising in combination a hub, means for securing the hub to a supporting wheel of the vehicle in axial alinement with the hub of the supporting wheel, said hub member having an annular flange projecting laterally therefrom, circumferentially spaced radial lugs on said flange, said lugs being apertured, a hub cap provided with a plurality of circumferentially spaced lateral studs adapted for reception in the apertures of said lugs, a manually operated member carried by said supplemental wheel and having engagement with said hub cap for actuating said hub cap to move said studs into and out of engagement with said lugs, and means for supporting said manually operated member on said supplemental wheel.

5. A supplemental wheel for a vehicle comprising in combination a hub and a tire supporting rim, means for securing said hub to a supporting wheel of the vehicle in axial alinement with the hub of the supporting wheel, a cap for the hub of said supplemental wheel, a web member carried by said supplemental wheel in axial alinement with the hub of said supplemental wheel, a shaft rotatably supported on said hub, means operatively connecting said cap with said shaft for movement axially of said shaft, and said cap and the said hub of the supplemental wheel being provided with complemental means for locking said cap in engagement with the last mentioned hub.

6. A supplemental wheel for a motor vehicle comprising in combination a hub, means for securing said hub to the hub of a supporting wheel of the vehicle for rotation with the latter, a web member carried by the supplemental wheel in axial alinement with said hub member, a shaft rotatably supported in said web member, a hand wheel on one end of the shaft, a cap for said hub member, means operatively connecting said cap with said shaft for movement of the cap axially of said shaft upon rotation of said hand wheel, said cap being provided with a plurality of circumferentially spaced studs, and said hub member being provided with a plurality of circumferentially spaced lugs adapted to be engaged by said studs upon movement of said cap in one direction for retaining said cap in relatively fixed position with respect to said hub, and means for locking said hand wheel against casual rotative movement.

7. A supplemental wheel for a vehicle comprising in combination a hub, means for securing the hub to a supporting wheel of the vehicle in axial alinement with the hub of the supporting wheel, said supplemental wheel being provided with a plurality of radial arms merging into a web connecting said arms remote from said hub, said web being arranged in axial alinement with said hub, a cap for said hub, said cap and said hub being provided with complemental means for securing said cap in engagement with said hub, a hand wheel rotatably mounted on said web, means operatively connecting said cap with said hand wheel for axial movement of said hub into and out of engagement with the latter upon rotation of said hand wheel, and means engageable with a spoke of the hand wheel and one of said arms for retaining said hand wheel against casual rotation.

8. A supplemental wheel for a vehicle comprising in combination a hub, means for securing the hub to a supporting wheel of the vehicle in axial alinement with the hub of the supporting wheel, said supplemental wheel being provided with a plurality of radial arms merging into a web connecting said arms remote from said hub, said web being arranged in axial alinement with said hub, a cap for said hub, said cap and said hub being provided with complemental means for securing said cap in engagement with said hub, a hand wheel rotatably mounted on said web, means operatively connecting said cap with said hand wheel for axial movement of said hub into and out of engagement with the latter upon rotation of said hand wheel, and means engageable with a spoke of the hand wheel and one of said arms for retaining said hand wheel against casual rotation, said last mentioned means including a sleeve engageable with a spoke of the hand wheel and one of said arms, and yieldable means engaging said sleeve for retaining the latter against casual displacement when said sleeve is in engagement with said one spoke and arm.

In testimony whereof I affix my signature.

JOHN PATRICK O'LEARY.